United States Patent
Slater et al.

(10) Patent No.: US 11,608,792 B2
(45) Date of Patent: Mar. 21, 2023

(54) CONTROL SYSTEM

(71) Applicant: J.C. BAMFORD EXCAVATORS LIMITED, Uttoxeter (GB)

(72) Inventors: Stephen Paul Slater, Uttoxeter (GB); Matthew Cook, Uttoxeter (GB); Mark David Van der Cruyssen, Uttoxeter (GB); Paul Stephen McCarthy, Uttoxeter (GB)

(73) Assignee: J.C. BAMFORD EXCAVATORS LIMITED, Uttoxeter (GB)

( * ) Notice: Subject to any disclaimer, the term of this patent is extended or adjusted under 35 U.S.C. 154(b) by 0 days.

(21) Appl. No.: 17/460,157

(22) Filed: Aug. 27, 2021

(65) Prior Publication Data

US 2022/0065183 A1    Mar. 3, 2022

(30) Foreign Application Priority Data

Aug. 27, 2020   (GB) .................................... 2013469

(51) Int. Cl.
 *F01N 3/00*    (2006.01)
 *F02D 41/02*   (2006.01)
 (Continued)

(52) U.S. Cl.
 CPC ........... *F02D 41/029* (2013.01); *F01N 3/023* (2013.01); *F01N 3/035* (2013.01); *F01N 9/002* (2013.01); *F02D 41/0245* (2013.01); *F02D 41/1446* (2013.01); *F02D 2041/026* (2013.01); *F02D 2200/0812* (2013.01)

(58) Field of Classification Search
 CPC ........ F02D 41/029; F02D 3/023; F02D 3/035; F02D 9/002; F02D 41/0245; F02D 41/1446; F02D 2041/026; F02D 2200/0812
 See application file for complete search history.

(56) References Cited

U.S. PATENT DOCUMENTS

| | | | | |
|---|---|---|---|---|
| 8,534,052 B2 * | 9/2013 | Itoga | ..................... | E02F 9/2228 60/287 |
| 9,038,375 B2 * | 5/2015 | Iwasaki | ................. | B60W 10/06 60/431 |

(Continued)

FOREIGN PATENT DOCUMENTS

| | | |
|---|---|---|
| EP | 1 553 267 A1 | 7/2005 |
| EP | 2 208 872 A1 | 7/2010 |

(Continued)

OTHER PUBLICATIONS

Search Report issued in GB 2013469.8, dated Jan. 6, 2021.

(Continued)

*Primary Examiner* — Matthew T Largi
(74) *Attorney, Agent, or Firm* — Marshall, Gerstein & Borun LLP

(57) ABSTRACT

A control system is provided for a diesel particulate filter (DPF) system of a diesel engine configured for operation in an off-highway vehicle. The control system includes a controller configured to receive a signal corresponding to a fill state of the DPF being at or above a first threshold. The controller is configured to selectively induce a parasitic load on the diesel engine to increase an operating temperature of the engine in response to receiving the signal.

18 Claims, 3 Drawing Sheets

(51) Int. Cl.
*F01N 3/023* (2006.01)
*F01N 3/035* (2006.01)
*F01N 9/00* (2006.01)
*F02D 41/14* (2006.01)

(56) References Cited

U.S. PATENT DOCUMENTS

| | | | |
|---|---|---|---|
| 2005/0155345 A1* | 7/2005 | Nakamura | F02D 41/029 60/311 |
| 2006/0282213 A1* | 12/2006 | Withrow | F02D 41/029 701/115 |
| 2007/0044453 A1 | 3/2007 | Strauser et al. | |
| 2008/0298977 A1* | 12/2008 | Juricak | B60T 10/04 417/1 |
| 2010/0122522 A1* | 5/2010 | Tsukada | E02F 9/00 60/284 |
| 2011/0173958 A1* | 7/2011 | Masuda | F01N 13/0097 60/285 |
| 2012/0134849 A1* | 5/2012 | Zhou | F15B 19/002 417/53 |
| 2012/0247087 A1 | 10/2012 | Hageman et al. | |
| 2013/0074481 A1* | 3/2013 | Miura | F01N 9/002 60/311 |
| 2013/0312616 A1* | 11/2013 | Shibamori | F01N 3/023 96/419 |
| 2015/0292183 A1* | 10/2015 | Hiraku | E02F 9/2289 60/423 |
| 2016/0069291 A1* | 3/2016 | Ge | B60W 20/15 701/103 |
| 2019/0242313 A1* | 8/2019 | Funato | F01N 3/023 |

FOREIGN PATENT DOCUMENTS

| | | |
|---|---|---|
| EP | 2 284 368 A1 | 2/2011 |
| EP | 2 423 481 A1 | 2/2012 |
| EP | 2 444 609 A1 | 4/2012 |
| EP | 2 516 824 A1 | 10/2012 |
| EP | 2 613 030 A1 | 7/2013 |
| EP | 2 657 475 A2 | 10/2013 |
| EP | 3 564 449 A1 | 11/2019 |
| GB | 2582212 A | 9/2020 |
| JP | 2009191654 A | 8/2009 |
| WO | WO-2011/117188 A1 | 9/2011 |
| WO | WO-2013/135717 A1 | 9/2013 |

OTHER PUBLICATIONS

Partial European Search Report for EP Application No. 21192221.6, dated Feb. 3, 2022.
Extended European Search Report for EP Applicatioin No. 21192221.6, dated May 2, 2022.

* cited by examiner

CONTROL SYSTEM

FIELD

The present teachings relate to a control system for an off-highway vehicle, an engine system for an off-highway vehicle, and to an off-highway vehicle.

BACKGROUND

Off-highway vehicles or working machines are for example those used in construction industries (e.g. backhoe loaders, slew excavators telescopic handlers, forklifts, skid-steer loaders, dump trucks, bulldozers, graders), agricultural industries (tractors, combine harvesters, self-propelled harvesters and sprayers), quarrying (e.g. loading shovels, aggregate crushing equipment), and forestry (timber harvesters, feller bunchers). One such off-highway vehicle is a dumper vehicle, often referred to as "site dumpers", which are manufactured in various different sizes to suit the needs of the application, ranging from those required for small building sites to those required for large scale construction projects.

Off-highway vehicles may be fitted with a diesel particulate filter (DPF) for removing diesel particulate matter or soot from the exhaust gas. Through continued used of the machine, the particulate matter or soot collects and accumulates on the filter which can decrease the effectiveness of the DPF.

In order to clean the DPF the soot collected on the DPF can be burned off, which is known as regeneration of the DPF. Typically, the regeneration may be done periodically to ensure that the soot build up does not exceed acceptable levels, but this can result in the regeneration occurring unnecessarily.

Passive DPF filters use a catalyst to remove accumulations, but need high temperatures to work. This cannot be guaranteed in normal working conditions or duties for off-highway applications. This is because the engine may spend a significant time idling, such that sufficient temperatures may not be achieved passively, or cannot be maintained for sufficient time to fully burn off the accumulated soot. Active regeneration of the DPF involves heating the filter to temperatures at which the soot can be burned off. Regeneration can take place when the accumulation of the particulate matter on the filter reaches a pre-determined level.

The present teachings seek to overcome or at least mitigate one or more problems associated with the prior art.

SUMMARY

A first aspect of the teachings provides a control system for a diesel particulate filter (DPF) system of a diesel engine of an engine system, configured for operation in an off-highway vehicle, the control system comprising: a controller configured to receive a signal corresponding to a fill state of the DPF being at or above a first threshold, wherein the controller is configured to selectively induce a parasitic load on the diesel engine to increase an operating temperature of the engine in response to receiving the signal.

Inducing a parasitic load onto an engine system has been found to be an effective way of inducing a parasitic load on the engine of an off-highway vehicle. Through inducing the parasitic load on the engine, the engine load, and consequently the operating temperature of the engine, is raised so as to become more favorable to regenerating the DPF during natural operation of the machine.

Inducing a parasitic load on the engine in response to a fill level of the DPF has been found to ensure the parasitic load is induced at the optimum point by selecting the most efficient point at which to apply said load.

The control system may be configured for operation in an off-highway vehicle comprising a hydraulic system. The controller may be configured to selectively induce the parasitic load onto the hydraulic system.

The induced parasitic load may be configured to raise the operating temperature of the engine to at least 300° C.

The hydraulic system may incorporate a hydraulic load valve. The controller may be configured to selectively actuate the hydraulic load valve to induce the parasitic load onto the hydraulic system.

Through use of the valve, the engine load, and consequently the operating temperature of the engine, is raised so as to become more favorable to regenerating the DPF during natural operation of the machine.

The hydraulic system may comprise a hydraulic circuit. The hydraulic load valve may be configured to increase hydraulic fluid pressure along the hydraulic circuit to induce the parasitic load onto the hydraulic system.

The hydraulic system may comprise a hydraulic circuit. The hydraulic circuit may comprise one or more hydraulic valves configured to selectively divert hydraulic fluid from the hydraulic circuit to power one or more hydraulic actuators, and wherein the hydraulic load valve is arranged on the hydraulic circuit downstream of the one or more hydraulic valves.

This arrangement ensures that the load valve does not significantly impact on the rest of the machine services.

The hydraulic system may comprise a hydraulic circuit. The hydraulic circuit may comprise one or more hydraulic valves configured to selectively divert hydraulic fluid from the hydraulic circuit to power one or more hydraulic actuators. The hydraulic circuit may comprise a bypass flow path arranged such that only hydraulic fluid not diverted to power the one or more hydraulic actuators flow along said bypass flow path, and the hydraulic load valve may be arranged on a carryover port of the hydraulic circuit.

The fitting of the load valve in a carryover port (e.g. an outlet port for returning hydraulic fluid to a hydraulic tank) allows pressure to be raised by the load valve without significantly impacting on the rest of the vehicle services.

The control system may be configured to calculate the minimal required parasitic load required for regenerating a DPF This arrangement ensures that the control system induces the minimal required parasitic load to ensure regeneration of the DPF is successful.

The diesel engine may have a maximum rated power output and the parasitic load may be less than 10% of the maximum rated power output, preferably less than 5% of the maximum rated power output.

The controller may be arranged to selectively remove the parasitic load on the engine when: a) an operator demanded engine speed is above a predetermined engine speed; and/or b) an operator demanded engine power is above a predetermined engine power; and/or c) a signal is received by the controller corresponding to a fill state of the DPF being at or above a second threshold, greater than the first threshold; and/or d) a signal is received by the controller corresponding to a fill state of the DPF being below the first threshold; and/or e) an exhaust gas temperature of the engine is above a predetermined temperature; and/or f) a hydraulic oil temperature of the engine is above a predetermined temperature; and/or g) a water temperature of the engine is above a predetermined temperature; and/or h) a lubricant temperature of the engine is above a predetermined temperature; and/or i) a temperature of a component of the engine is above a predetermined temperature.

The controller may be configured to selectively induce the parasitic load on the diesel engine by increasing the engine speed.

The controller may be configured to increase the engine speed in the range 1400-1800 RPM, for example approximately 1600 RPM.

Advantageously, the vehicle automatically elevates the engine speed, thus increasing of engine idle speed and helping to ensure regeneration of the DPF has the opportunity to take place during stationary machine periods, such as when the dumper vehicle is being loaded or unloaded.

Increasing the engine speed in response to a fill level of the DPF has been found to ensure the engine speed is increased at the optimum point by selecting the most efficient point at which to apply said load, minimizing the time spent under additional load, which in turn reduces fuel consumption.

The controller may be configured to receive a signal corresponding to a fill state of the DPF being at or above a second threshold, greater than the first threshold, and to selectively increase the engine speed in response to receiving the signal.

The controller may be arranged to selectively remove the induced engine speed parasitic load: a) upon receipt by the controller of a signal indicative of an operator demand to move the vehicle; and/or b) upon receipt by the controller of a signal indicative of an operator demand to power one of the hydraulic actuators; and/or c) when a signal is received by the controller corresponding to a fill state of the DPF below a second threshold; and/or d) when an exhaust gas temperature of the engine is above a pre-determined temperature; and/or e) when a hydraulic oil temperature of the engine is above a predetermined temperature; and/or f) when a water temperature of the engine is above a predetermined temperature; and/or g) when a lubricant temperature of the engine is above a predetermined temperature; and/or h) when a temperature of a component of the engine is above a predetermined temperature.

This helps to ensure regeneration of the DPF has the opportunity to take place when the vehicle is stationary and in a "safe state" in response to a further signal broadcast by the engine.

The controller may be configured to receive a signal corresponding to a stationary state of the off-highway vehicle. The controller may be configured to only induce the engine speed parasitic load when the off-highway vehicle is in the stationary state.

The signal corresponding to a stationary state of the off-highway vehicle may be generated when: a) the off-highway vehicle has a travelling speed of approximately zero; and/or b) the off-highway vehicle is in neutral; and/or c) a parking brake of the off-highway vehicle has been actuated.

The controller may be configured to receive a signal corresponding to a fill state of the DPF being at or above a third threshold, greater than the second threshold. The controller may be configured to selectively limit the power output of the diesel engine in response to receiving the signal.

The controller may be configured to set a maximum engine speed in the range 1000-1400 RPM, for example approximately 1200 RPM.

The controller may be configured to receive a signal corresponding to a fill state of the DPF being at or above a fourth threshold, greater than the third threshold, and to selectively prevent operation of the off-highway vehicle in response to receiving the signal.

A second aspect of the teachings provides an engine system for an off-highway vehicle, the engine system comprising: a diesel engine; a diesel particulate filter (DPF) system comprising a DPF and a sensor configured to monitor a fill state of the DPF and to generate a signal when the fill state of the DPF is at or above a first threshold; a control system comprising a controller, wherein the controller is configured to receive the signal and to selectively induce a parasitic load on the diesel engine to increase the diesel engine operating temperature in response to receiving the signal corresponding to the fill state of the DPF being at or above a first threshold.

The control system may be configured for operation in an off-highway vehicle comprising a hydraulic system. The controller may be configured to selectively induce the parasitic load onto the hydraulic system.

The induced parasitic load may be configured to raise the operating temperature of the engine to at least 300° C.

The hydraulic system may incorporate a hydraulic load valve. The controller may be configured to selectively actuate the hydraulic load valve to induce the parasitic load onto the hydraulic system.

The hydraulic system may comprise a hydraulic circuit. The hydraulic load valve may be configured to increase hydraulic fluid pressure along the hydraulic circuit to induce the parasitic load onto the hydraulic system.

The hydraulic system may comprise a hydraulic circuit. The hydraulic circuit may comprise one or more hydraulic valves configured to selectively divert hydraulic fluid from the hydraulic circuit to power one or more hydraulic actuators, and wherein the hydraulic load valve is arranged on the hydraulic circuit downstream of the one or more hydraulic valves.

The hydraulic system may comprise a hydraulic circuit. The hydraulic circuit may comprise one or more hydraulic valves configured to selectively divert hydraulic fluid from the hydraulic circuit to power one or more hydraulic actuators. The hydraulic circuit may comprise a bypass flow path arranged such that only hydraulic fluid not diverted to power the one or more hydraulic actuators flow along said bypass flow path, and the hydraulic load valve may be arranged on a carryover port of the hydraulic circuit.

The control system may be configured to calculate the minimal required parasitic load required for regenerating a DPF The diesel engine may have a maximum rated power output and the parasitic load may be less than 10% of the maximum rated power output, preferably less than 5% of the maximum rated power output.

The controller may be arranged to selectively remove the parasitic load on the engine when: a) an operator demanded engine speed is above a predetermined engine speed; and/or b) an operator demanded engine power is above a predetermined engine power; and/or c) a signal is received by the controller corresponding to a fill state of the DPF being at or above a second threshold, greater than the first threshold; and/or d) a signal is received by the controller corresponding to a fill state of the DPF being below the first threshold; and/or e) an exhaust gas temperature of the engine is above a predetermined temperature; and/or f) a hydraulic oil temperature of the engine is above a predetermined temperature; and/or g) a water temperature of the engine is above a predetermined temperature; and/or h) a lubricant temperature of the engine is above a predetermined temperature; and/or i) a temperature of a component of the engine is above a predetermined temperature.

The controller may be configured to selectively induce the parasitic load on the diesel engine by increasing the engine speed.

The controller may be configured to increase the engine speed in the range 1400-1800 RPM, for example approximately 1600 RPM.

The controller may be configured to receive a signal corresponding to a fill state of the DPF being at or above a second threshold, greater than the first threshold, and to selectively increase the engine speed in response to receiving the signal.

The controller may be arranged to selectively remove the induced engine speed parasitic load: a) upon receipt by the controller of a signal indicative of an operator demand to move the vehicle; and/or b) upon receipt by the controller of a signal indicative of an operator demand to power one of the hydraulic actuators; and/or c) when a signal is received by the controller corresponding to a fill state of the DPF below a second threshold; and/or d) when an exhaust gas temperature of the engine is above a pre-determined temperature; and/or e) when a hydraulic oil temperature of the engine is above a predetermined temperature; and/or f) when a water temperature of the engine is above a predetermined temperature; and/or g) when a lubricant temperature of the engine is above a predetermined temperature; and/or h) when a temperature of a component of the engine is above a predetermined temperature.

The controller may be configured to receive a signal corresponding to a stationary state of the off-highway vehicle. The controller may be configured to only induce the engine speed parasitic load when the off-highway vehicle is in the stationary state.

The signal corresponding to a stationary state of the off-highway vehicle may be generated when: a) the off-highway vehicle has a travelling speed of approximately zero; and/or b) the off-highway vehicle is in neutral; and/or c) a parking brake of the off-highway vehicle has been actuated.

The controller may be configured to receive a signal corresponding to a fill state of the DPF being at or above a third threshold, greater than the second threshold. The controller may be configured to selectively limit the power output of the diesel engine in response to receiving the signal.

The controller may be configured to set a maximum engine speed in the range 1000-1400 RPM, for example approximately 1200 RPM.

The controller may be configured to receive a signal corresponding to a fill state of the DPF being at or above a fourth threshold, greater than the third threshold, and to selectively prevent operation of the off-highway vehicle in response to receiving the signal.

A third aspect of the teachings provides an off-highway vehicle or a working machine comprising an engine system according to the second aspect.

A fourth aspect of the teachings provides an off-highway vehicle or a working machine comprising: engine system comprising: a diesel engine; a diesel particulate filter (DPF) system comprising a DPF and a sensor configured to monitor a fill state of the DPF and to generate a signal when the fill state of the DPF is at or above a first threshold; a control system comprising a controller, wherein the controller is configured to receive the signal and to selectively induce a parasitic load on the diesel engine to increase the diesel engine operating temperature in response to receiving the signal corresponding to the fill state of the DPF being at or above a first threshold.

The off-highway vehicle may be a dumper vehicle, a backhoe loader, an excavator, a telescopic handler, a forklift, or a skid-steer loader.

The off-highway vehicle may be a dumper vehicle comprising a frame, front and rear wheels mounted to the frame, an operator seat mounted to the frame, and an open topped container for carrying a load therein mounted to the frame between the front and rear wheels, wherein the container is moveable between a transport position for transporting a load and a discharge position for discharging of a load.

The off-highway vehicle may comprise an operator cab having the operator seat therein.

The off-highway vehicle may comprise a body and a working arm mounted to the body.

The off-highway vehicle may comprise a hydraulic system. The controller may be configured to selectively induce the parasitic load onto the hydraulic system.

The induced parasitic load may be configured to raise the operating temperature of the engine to at least 300° C.

The hydraulic system may incorporate a hydraulic load valve. The controller may be configured to selectively actuate the hydraulic load valve to induce the parasitic load onto the hydraulic system.

The hydraulic system may comprise a hydraulic circuit.

The hydraulic load valve may be configured to increase hydraulic fluid pressure along the hydraulic circuit to induce the parasitic load onto the hydraulic system.

The hydraulic circuit may comprise one or more hydraulic valves configured to selectively divert hydraulic fluid from the hydraulic circuit to power one or more hydraulic actuators, and wherein the hydraulic load valve is arranged on the hydraulic circuit downstream of the one or more hydraulic valves.

The hydraulic circuit may comprise one or more hydraulic valves configured to selectively divert hydraulic fluid from the hydraulic circuit to power one or more hydraulic actuators. The hydraulic circuit may comprise a bypass flow path arranged such that only hydraulic fluid not diverted to power the one or more hydraulic actuators flow along said bypass flow path, and the hydraulic load valve may be arranged on a carryover port of the hydraulic circuit.

The control system may be configured to calculate the minimal required parasitic load required for regenerating the DPF The diesel engine may have a maximum rated power output and the parasitic load may be less than 10% of the maximum rated power output, preferably less than 5% of the maximum rated power output.

The controller may be arranged to selectively remove the parasitic load on the engine when: a) an operator demanded engine speed is above a predetermined engine speed; and/or b) an operator demanded engine power is above a predetermined engine power; and/or c) a signal is received by the controller corresponding to a fill state of the DPF being at or above a second threshold, greater than the first threshold; and/or d) a signal is received by the controller corresponding to a fill state of the DPF being below the first threshold; and/or e) an exhaust gas temperature of the engine is above a predetermined temperature; and/or f) a hydraulic oil temperature of the engine is above a predetermined temperature;

and/or g) a water temperature of the engine is above a predetermined temperature; and/or h) a lubricant temperature of the engine is above a predetermined temperature; and/or i) a temperature of a component of the engine is above a predetermined temperature.

The controller may be configured to selectively induce the parasitic load on the diesel engine by increasing the engine speed.

The controller may be configured to increase the engine speed in the range 1400-1800 RPM, for example approximately 1600 RPM.

The controller may be configured to receive a signal corresponding to a fill state of the DPF being at or above a second threshold, greater than the first threshold, and to selectively increase the engine speed in response to receiving the signal.

The controller may be arranged to selectively remove the induced engine speed parasitic load: a) upon receipt by the controller of a signal indicative of an operator demand to move the vehicle; and/or b) upon receipt by the controller of a signal indicative of an operator demand to power one of the hydraulic actuators; and/or c) when a signal is received by the controller corresponding to a fill state of the DPF below a second threshold; and/or d) when an exhaust gas temperature of the engine is above a pre-determined temperature; and/or e) when a hydraulic oil temperature of the engine is above a predetermined temperature; and/or f) when a water temperature of the engine is above a predetermined temperature; and/or g) when a lubricant temperature of the engine is above a predetermined temperature; and/or h) when a temperature of a component of the engine is above a predetermined temperature.

The controller may be configured to receive a signal corresponding to a stationary state of the off-highway vehicle. The controller may be configured to only induce the engine speed parasitic load when the off-highway vehicle is in the stationary state.

The signal corresponding to a stationary state of the off-highway vehicle may be generated when: a) the off-highway vehicle has a travelling speed of approximately zero; and/or b) the off-highway vehicle is in neutral; and/or c) a parking brake of the off-highway vehicle has been actuated.

The controller may be configured to receive a signal corresponding to a fill state of the DPF being at or above a third threshold, greater than the second threshold. The controller may be configured to selectively limit the power output of the diesel engine in response to receiving the signal.

The controller may be configured to set a maximum engine speed in the range 1000-1400 RPM, for example approximately 1200 RPM.

The controller may be configured to receive a signal corresponding to a fill state of the DPF being at or above a fourth threshold, greater than the third threshold, and to selectively prevent operation of the off-highway vehicle in response to receiving the signal.

BRIEF DESCRIPTION OF THE DRAWINGS

Embodiments will now be described with reference to the accompanying drawings, in which.

DETAILED DESCRIPTION OF EMBODIMENT(S)

Figure 1:
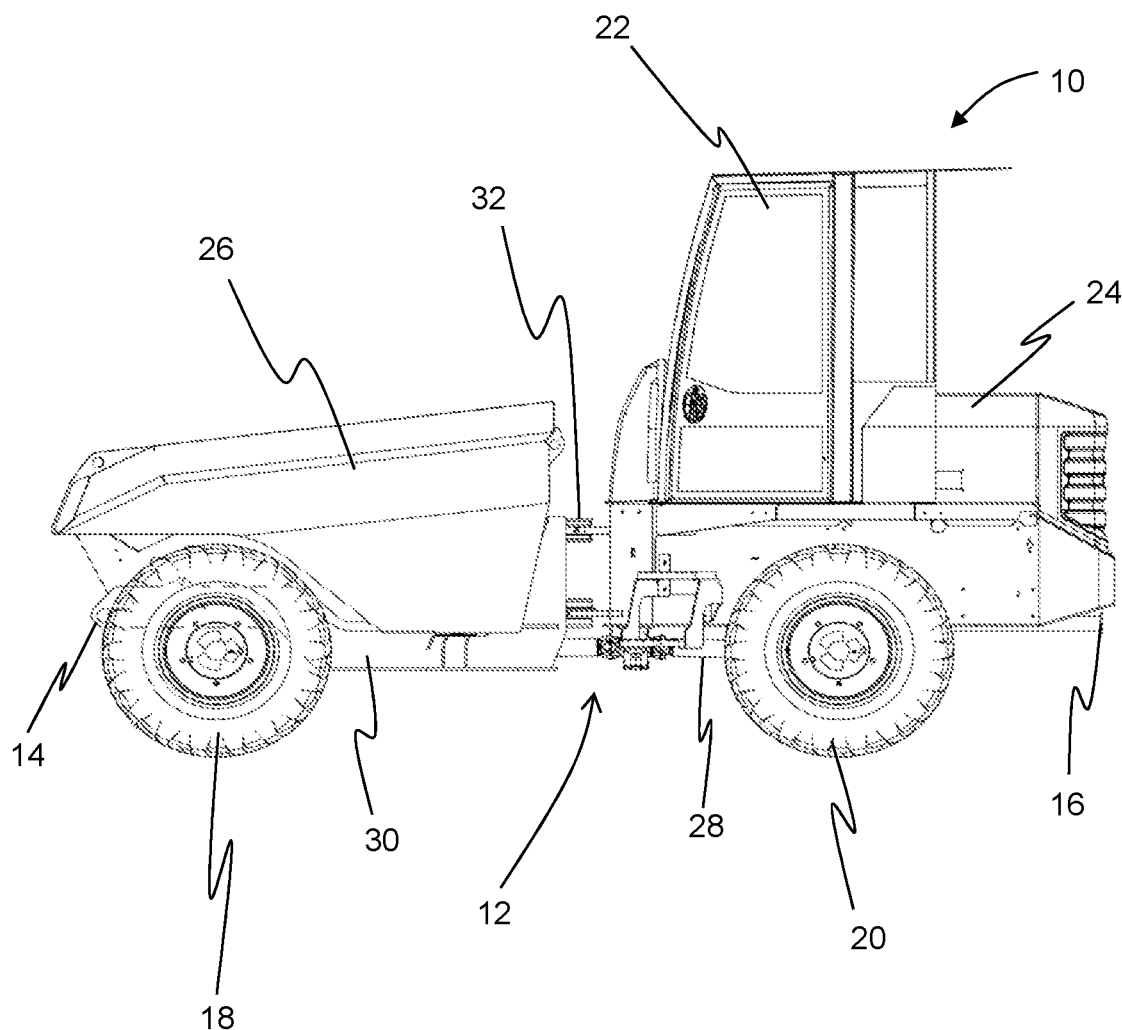
FIG. 1 is an isometric view of an off-highway vehicle according to an embodiment.

Referring firstly to FIG. 1, an off-highway vehicle, also known as a working machine, is illustrated and is indicated generally at 10.

In the illustrated arrangement, the off-highway vehicle 10 is a dumper vehicle. In alternative arrangements, the off-highway vehicle or working machine may be selected from those used in construction industries (e.g. backhoe loaders, slew excavators telescopic handlers, forklifts, skid-steer loaders, dump trucks, bulldozers, graders), agricultural industries (e.g. tractors, combine harvesters, self-propelled harvesters and sprayers), quarrying (e.g. loading shovels, aggregate crushing equipment), and forestry (e.g. timber harvesters, feller bunchers).

The dumper vehicle 10 has a nominal laden capacity of 6 metric tons and a volume of heaped material (e.g. earth) of between 3.2-3.6 m3 and of flowable material (e.g. concrete) of approximately 2.0 m3. The vehicle 10 includes a structural chassis frame 12 having a front end 14 and a rear end 16. The frame 12 has two sets of wheels mounted to the frame, two front wheels 18 mounted proximate the front end 14 of the frame 12, and two rear wheels 20 mounted proximate the rear end 16 of the frame 12.

The frame 12 also has an operator seat mounted to the frame 12. The operator seat is located proximate to the rear wheels 20 along the longitudinal length of the frame 12. In the illustrated embodiment, the operator seat is provided within an operator cab 22. However, it will be appreciated that in alternative arrangements, an operator cab 22 may not be provided and a roll cage will be used instead.

The dumper vehicle 10 includes a housing 24 for housing a diesel engine of an engine system. The housing 24, and so the engine, are located rearward of the cab 22 on the frame 12. The housing 24 forms the rear extent of the dumping vehicle 10.

Although not illustrated, the engine system includes an after-treatment system so as to reduce the emissions of the engine system. The after-treatment system includes a DPF filter arranged in the exhaust flow path of the engine system so as to be capable of filtering particulate matter or soot from the engine exhaust gas. The engine system includes a sensor configured to monitor a fill state of the DPF and to generate a signal when the fill state of the DPF is at one or more pre-determined threshold levels.

An open topped container 26 for carrying a load therein, commonly referred to as a skip, is also mounted to the frame 12. The container 26 is positioned such that a majority of the elongate length of the container 26 is situated between the front 18 and rear wheels 20. The container 26 is pivotally mounted to the frame 12, via two pivotable mounts (not shown), which enables the container 26 to be moveable or pivotable proximate the front of both the container 26 and the frame 12 between a transport position for transporting a load and a discharge position for discharging of a load.

The frame 12 of the dumper vehicle 10 is provided in two parts that are able to articulate about at least a vertical axis with respect to each other. That is, the frame 12 includes a main chassis 28 and a front chassis 30.

The operator seat and operator cab 22 (or roll bar in alternative embodiments) are mounted to the main chassis 28. The container 26 is mounted to the front chassis 30. The main chassis 28 and the front chassis 30 are pivotally connected together via a linkage 32. The linkage 32 is such that the front chassis 30 is able to pivot or articulate about a vertical axis up to an angle of up to 35° with respect to the main chassis 28.

Figure 2:
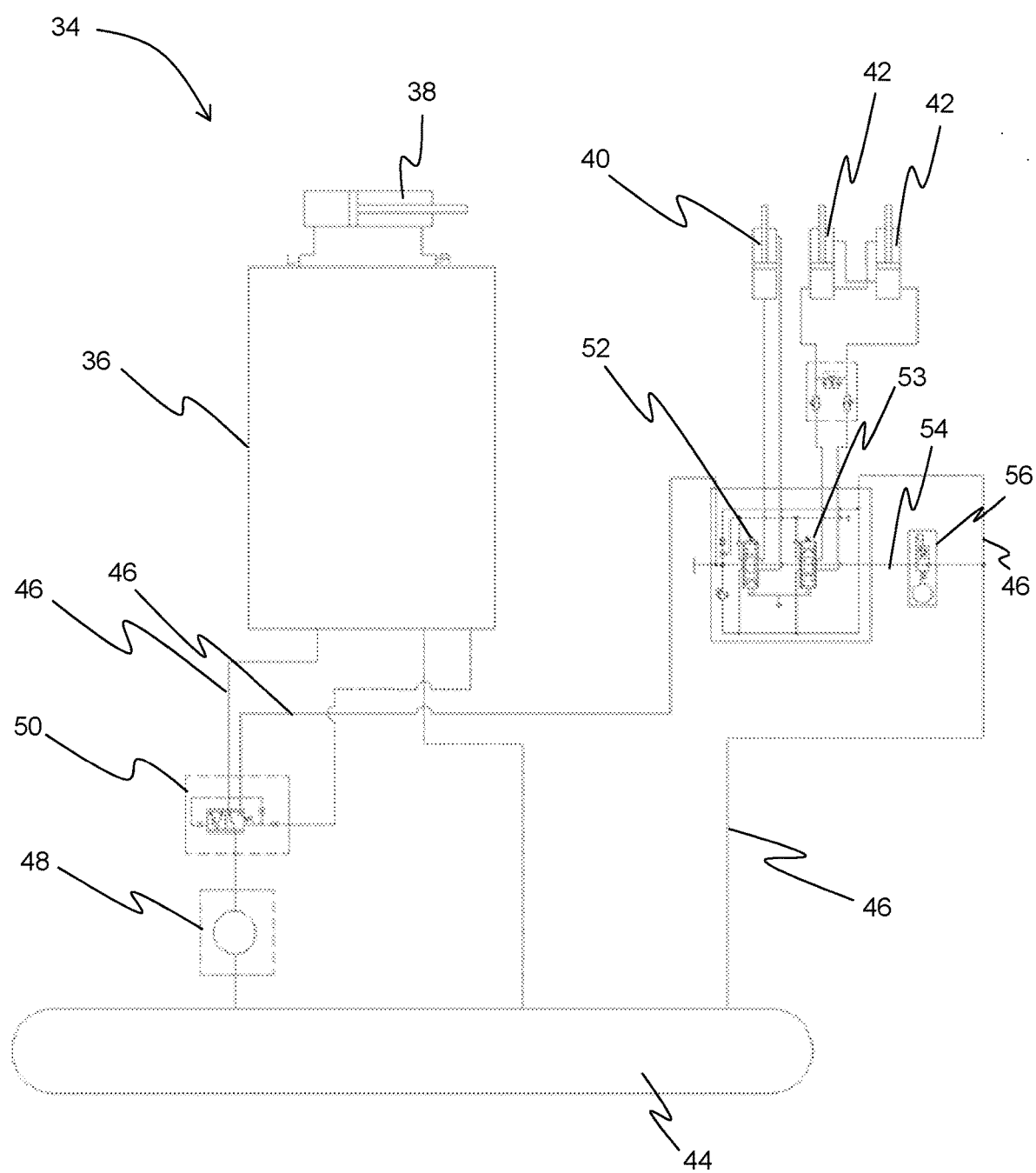
FIG. 2 is a schematic diagram of the hydraulic system of the off-highway vehicle of FIG. 1.

Referring now to FIG. 2, a hydraulic system for the off-highway vehicle 10 is illustrated and is indicated generally at 34.

The hydraulic system 34 includes a steering system 36 for steering the off-highway vehicle 10. The steering system 36 includes a hydraulic actuator 38 configured to pivot the front wheels 18 of the off-highway vehicle 10.

The hydraulic system 34 includes a hydraulic actuator 40 configured to control a function of the off-highway vehicle 10. The hydraulic actuator 40 is configured to move or pivot the container 26 between the transport position for transporting a load and the discharge position for discharging of a load.

The hydraulic system 34 includes a hydraulic actuator 42 configured to control a function of the off-highway vehicle 10. The hydraulic actuator 42 is configured to slew the container 26 about a substantially upright axis (i.e. slew about a substantially horizontal plane). In the illustrated arrangement, two hydraulic actuators 42 are provided for slewing the container 26. In alternative arrangements, only a single hydraulic actuator 42 may be provided, or the hydraulic actuators 42 may be omitted from the off-highway vehicle 10. In arrangements where the off-highway vehicle 10 is not a dumper vehicle, it will be appreciated that the off-highway vehicle will be provided with one or more hydraulic actuators configured to control one or more functions of the off-highway vehicle.

The hydraulic system 34 includes a sump or reservoir 44 and a hydraulic circuit 46 defining a flow path for conveying hydraulic fluid to the hydraulic actuators 38, 40, 42. A hydraulic pump system 48 conveys a flow rate of hydraulic fluid along the hydraulic fluid circuit 46 to provide hydraulic fluid to the hydraulic actuators 38, 40, 42. In the illustrated embodiment, the hydraulic pump system 48 includes a fixed displacement pump. In alternative embodiments, the hydraulic pump system 48 may include multiple hydraulic pumps (e.g. a high displacement pump and a low displacement pump) configured to provide different rates of flow along the hydraulic circuit 46 to actuate the hydraulic actuators 38, 40, 42. The engine of the engine system drives the hydraulic pump system 48 in response to the demand or load from the hydraulic actuators 38, 40, 42. Whilst the hydraulic pump or pumps have been described as being a fixed hydraulic pump, it will be appreciated that in alternative arrangements the off-highway vehicle may include one or more variable hydraulic pumps.

The hydraulic system 34 includes a first valve 50 provided along the hydraulic fluid circuit 46. The first valve 50 is moveable between an active state and an inactive state. In the active state, the first valve 50 is configured to divert hydraulic fluid flow from the hydraulic fluid circuit 46, such that a rate of hydraulic fluid flow is delivered to the steering actuator 38. Hydraulic fluid that is directed to the steering system 36 returns to the sump 44 after exiting the steering system 36.

In the illustrated embodiment, the first valve is priority valve 50. The priority valve is configured to ensure that even when hydraulic fluid is being directed to other hydraulic actuators of the off-highway vehicle 10, an amount of hydraulic fluid flow is directed to the steering actuator 38. This arrangement helps to ensure that steering of the off-highway vehicle 10 is always possible.

The hydraulic system 34 includes a second valve 52 provided along the hydraulic fluid circuit 46. The second valve 52 is moveable between an active state and an inactive state. In the active state, the second valve 52 is configured to divert hydraulic fluid flow from the hydraulic fluid circuit 46, such that a rate of hydraulic fluid flow is delivered to the hydraulic actuator 40.

The hydraulic system 34 includes a third valve 53 provided along the hydraulic fluid circuit 46. The third valve 53 is moveable between an active state and an inactive state. In the active state, the third valve 53 is configured to divert hydraulic fluid flow from the hydraulic fluid circuit 46, such that a rate of hydraulic fluid flow is delivered to the hydraulic actuator(s) 42. Hydraulic fluid that has been diverted from the hydraulic circuit 46 to hydraulic actuators 40, 42 subsequently returns to the hydraulic circuit 46.

The hydraulic circuit 46 includes a bypass port or flow path 54 that extends from the second and or third valves 52, 53. The bypass port 54 is configured such that only hydraulic fluid that is not diverted to the hydraulic actuator 40 and or hydraulic actuator 42 flows along the bypass port 54. The bypass port 54 is positioned between the final valve on the hydraulic circuit 46 and the sump 44.

A load valve 56 is positioned on the bypass port 54. The load valve 56 is moveable between an active state and an inactive state. In the active state, the load valve 56 is configured induce a hydraulic load on the hydraulic system 34. Put another way, in an active state, the load valve 56 is configured to induce a parasitic load on the hydraulic system 34.

When there is no demand from steering actuator 38 or actuators 40, 42, hydraulic fluid flow is directed along the hydraulic circuit 46 from the sump 44 back to the sump 44. With the load valve 56 in an inactive state, there is little to no resistance to hydraulic fluid flow. Consequently, the pressure in the hydraulic circuit 46 is low in this state, and the load on the engine is low.

By switching the load valve 56 to an active state, hydraulic fluid is prevented from flowing through the load valve 56 until the hydraulic fluid in the hydraulic circuit 46 has reached a pre-determined threshold value. In this way, the load valve 56, when in the active state, increases the hydraulic pressure in the hydraulic circuit 46, which increases the load on the engine. This increased load on the engine consequently heats the DPF.

Figure 3:
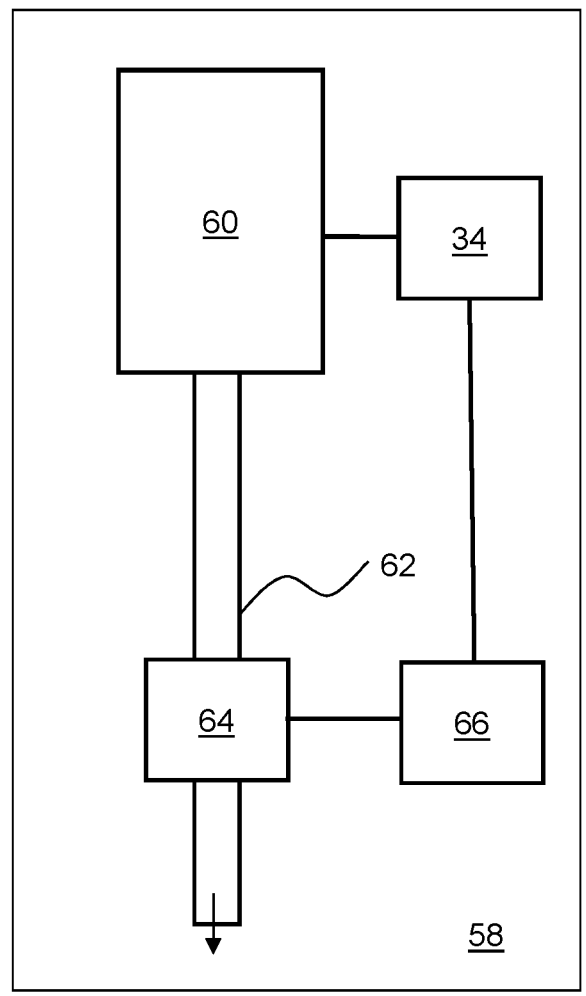
FIG. 3 is a schematic diagram of an engine system of the off-highway vehicle of FIG. 1.

Referring now to FIG. 3, the engine system 58 configured to power the off-highway vehicle 10 is illustrated.

The engine system 58 includes a diesel engine 60. The engine 60 is configured to power the wheels 18, 20 to propel the off-highway vehicle 10. The engine 60 is configured to power the hydraulic system 34.

Exhaust gases exit the engine 60 via an exhaust duct 62. A DPF 64 is installed along the exhaust duct 62. The engine system includes a sensor (not shown) configured to monitor a fill state of the DPF 64. The engine system 58 generates a signal when the fill state of the DPF 64 is at or above different threshold values.

The engine system 58 includes a control system 66. The control system 66 includes a controller configured to receive the signal from the engine system 58 corresponding to a fill state of the DPF 64.

When the controller receives a signal corresponding to the fill state of the DPF 64 being at or above a first threshold level or value, the controller selectively induces a parasitic load on the engine 60 to increase the operating temperature of the engine 60. This increased operating temperature raises the temperature of the DPF 64 so as to become more favorable to regenerating the DPF 64 during natural operation of the off-highway vehicle 10.

In order to induce the parasitic load onto the hydraulic system 34 the controller is configured to selectively actuate the hydraulic load valve 56 to induce the parasitic load. The engine 60 has a maximum rated power output and the parasitic load is less than 10% of the maximum rated power output, but may be less than 5% of the maximum rated power output. It will be understood that the parasitic load induced should be minimized to reduce excessive fuel consumption. The control system 66 is configured to induce the minimal required parasitic load that is sufficient to ensure regeneration is successful.

The controller of the control system 66 is configured to selectively remove the parasitic load on the engine 60 under different conditions. The controller may remove the parasitic load when: an operator demanded engine speed is above a predetermined engine speed; an operator demanded engine power is above a predetermined engine power; a signal is received by the controller corresponding to a fill state of the DPF 64 being at or above a second threshold, greater than the first threshold; a signal is received by the controller corresponding to a fill state of the DPF 64 being below the first threshold; or an exhaust gas temperature of the engine 60 is above a predetermined temperature.

The controller is configured to selectively induce the parasitic load on the engine 60 by increasing the engine speed. For exemplary purposes, the controller may increase the engine speed in the range 1400-1800 RPM, for example approximately 1600 RPM.

In the present embodiment, the controller is configured to selectively increase the engine speed in response to receiving a signal corresponding to a fill state of the DPF 64 being at or above a second threshold, which greater than the first threshold.

The controller of the control system 66 is configured to selectively remove the increased engine speed demand on the engine 60 under different conditions. The controller may remove the increased engine speed demand: upon receipt by the controller of a signal indicative of an operator demand to move the vehicle; upon receipt by the controller of a signal indicative of an operator demand to power one of the hydraulic actuators; when a signal is received by the controller corresponding to a fill state of the DPF below a second threshold; when an exhaust gas temperature of the engine is above a pre-determined temperature.

In some arrangements, the controller may be configured to only enable the increased engine speed demand to occur when the off-highway vehicle 10 is stationary. For this purpose, the controller may be configured to receive a signal corresponding to a stationary state of the off-highway vehicle 10, and to only induce the engine speed parasitic load when the off-highway vehicle 10 is in the stationary state.

The stationary state of the off-highway vehicle may be generated through one or more of the off-highway vehicle has a travelling speed of approximately zero, the off-highway vehicle is in neutral, or a parking brake of the off-highway vehicle has been actuated, or through any other suitable condition of the off-highway vehicle 10.

When the fill state of the DPF 64 is at a third threshold level, which is greater than the second threshold, the engine system 58 emits a signal. The controller is configured to receive the signal corresponding to a fill state of the DPF 64 being at or above the third threshold and to limit the power output of the engine 60. For exemplary purposes, the controller may be configured to set a maximum engine speed in the range 1000-1400 RPM, for example approximately 1200 RPM.

When the fill state of the DPF 64 is at a fourth threshold level, which is greater than the third threshold, the engine system 58 emits a signal. The controller is configured to receive the signal corresponding to a fill state of the DPF 64 being at or above the fourth threshold and to prevent operation of the off-highway vehicle 10 in response to receiving the signal.

Although the teachings have been described above with reference to one or more preferred embodiments, it will be appreciated that various changes or modifications may be made without departing from the scope as defined in the appended claims.

The invention claimed is:

1. A control system for a diesel particulate filter (DPF) system of a diesel engine of an engine system, configured for operation in an off-highway vehicle, the control system comprising:
   a controller configured for operation in the off-highway vehicle comprising a hydraulic system, the controller arranged to receive a signal corresponding to a fill state of the DPF being at or above a first threshold,
   wherein the controller is configured to:
   selectively induce a parasitic load on the hydraulic system to increase an operating temperature of the diesel engine in response to receiving the signal corresponding to the fill state of the DPF being at or above the first threshold; and
   selectively remove the parasitic load on the hydraulic system and to induce a parasitic load on the diesel engine by increasing an engine speed when the signal is received by the controller corresponding to the fill state of the DPF being at or above a second threshold, the second threshold being greater than the first threshold.

2. The control system as defined in claim 1, wherein the induced parasitic load on the hydraulic system is configured to raise the operating temperature of the diesel engine to at least 300° C.

3. The control system as defined in claim 1, wherein the hydraulic system incorporates a hydraulic load valve, and wherein the controller is configured to selectively actuate the hydraulic load valve to induce the parasitic load on the hydraulic system.

4. The control system according to claim 3, wherein the hydraulic system comprises a hydraulic circuit, and wherein the hydraulic load valve is configured to increase hydraulic fluid pressure along the hydraulic circuit to induce the parasitic load onto the hydraulic system.

5. The control system as defined in claim 3, wherein the hydraulic system comprises a hydraulic circuit, wherein the hydraulic circuit comprises one or more hydraulic valves configured to selectively divert hydraulic fluid from the hydraulic circuit to power one or more hydraulic actuators, and wherein the hydraulic load valve is arranged on the hydraulic circuit downstream of the one or more hydraulic valves.

6. The control system as defined in claim 3, wherein the hydraulic system comprises a hydraulic circuit, wherein the hydraulic circuit comprises one or more hydraulic valves configured to selectively divert hydraulic fluid from the hydraulic circuit to power one or more hydraulic actuators, wherein the hydraulic circuit comprises a bypass flow path arranged such that only hydraulic fluid not diverted to power the one or more hydraulic actuators flow along said bypass flow path, and wherein the hydraulic load valve is arranged on a carryover port of the hydraulic circuit.

7. The controller as defined in claim 1, wherein the control system is configured to calculate a minimal required parasitic load required for regenerating the DPF, and wherein the diesel engine has a maximum rated power output and the parasitic load is less than 10% of the maximum rated power output.

8. The control system as defined in claim 1, wherein the controller is arranged to selectively remove the induced parasitic load on the hydraulic system when:
- an operator demanded engine speed is above a predetermined engine speed; and/or
- an operator demanded engine power is above a predetermined engine power; and/or
- the signal is received by the controller corresponding to the fill state of the DPF being below the first threshold; and/or
- an exhaust gas temperature of the diesel engine is above a predetermined exhaust gas temperature; and/or
- a hydraulic oil temperature of the diesel engine is above a predetermined hydraulic oil temperature; and/or
- a water temperature of the diesel engine is above a predetermined water temperature; and/or
- a lubricant temperature of the diesel engine is above a predetermined lubricant temperature; and/or
- a temperature of a component of the engine is above a predetermined component temperature.

9. The control system as defined in claim 1, wherein the controller is configured to increase the engine speed in a range of 1400-1800 RPM.

10. The control system as defined in claim 1, wherein the controller is arranged to selectively remove the induced parasitic load on the diesel engine:
- upon receipt by the controller of a signal indicative of an operator demand to move the vehicle; and/or
- upon receipt by the controller of the signal indicative of the operator demand to power one of the hydraulic actuators; and/or
- when the signal is received by the controller corresponding to the fill state of the DPF below the second threshold; and/or
- when an exhaust gas temperature of the diesel engine is above a predetermined exhaust gas temperature; and/or
- when a hydraulic oil temperature of the diesel engine is above a predetermined hydraulic oil temperature; and/or
- when a water temperature of the diesel engine is above a predetermined water temperature; and/or
- when a lubricant temperature of the diesel engine is above a predetermined lubricant temperature; and/or
- when a temperature of a component of the diesel engine is above a predetermined component temperature.

11. The control system as defined in claim 1, wherein the controller is configured to receive a signal corresponding to a stationary state of the off-highway vehicle, and wherein the controller is configured to only induce the engine speed parasitic load when the off-highway vehicle is in the stationary state.

12. The control system as defined in claim 11, wherein the signal corresponding to the stationary state of the off-highway vehicle is generated when:
- the off-highway vehicle has a travelling speed of zero; and/or
- the off-highway vehicle is in neutral; and/or
- a parking brake of the off-highway vehicle has been actuated.

13. The control system as defined in claim 1, wherein the controller is configured to receive the signal corresponding to the fill state of the DPF being at or above a third threshold, greater than the second threshold, and wherein the controller is configured to selectively limit the power output of the diesel engine in response to receiving the signal, and wherein the controller is configured to set a maximum engine speed in a range of 1000-1400 RPM.

14. The control system as defined in claim 1, wherein the controller is configured to receive the signal corresponding to the fill state of the DPF being at or above a fourth threshold, greater than a third threshold, and to selectively prevent operation of the off-highway vehicle in response to receiving the signal.

15. An off-highway vehicle comprising:
- an engine system comprising:
  - a diesel engine;
  - a diesel particulate filter (DPF) system comprising a DPF and a sensor; and
- the control system according to claim 1.

16. The off-highway vehicle as defined in claim 15, wherein the off-highway vehicle is a dumper vehicle, a backhoe loader, an excavator, a telescopic handler, a forklift, or a skid-steer loader.

17. The off-highway vehicle as defined in claim 15, wherein the off-highway vehicle is a dumper vehicle comprising a frame, front and rear wheels mounted to the frame, an operator seat mounted to the frame, and an open topped container for carrying a load therein mounted to the frame between the front and rear wheels, wherein the container is moveable between a transport position for transporting the load and a discharge position for discharging of the load.

18. A control system for a diesel particulate filter (DPF) system of a diesel engine of an engine system, configured for operation in an off-highway vehicle, the control system comprising:
- a controller configured for operation in the off-highway vehicle comprising a hydraulic system, the controller arranged to receive a signal corresponding to a fill state of the DPF being at or above a first threshold,
- wherein the controller is configured to:
- selectively induce a parasitic load on the hydraulic system to increase an operating temperature of the diesel engine in response to receiving the signal corresponding to the fill state of the DPF being at or above the first threshold;
- selectively induce a parasitic load on the diesel engine by increasing an engine speed when the signal is received by the controller corresponding to the fill state of the DPF being at or above a second threshold, the second threshold being greater than the first threshold;
- selectively induce the parasitic load on the diesel engine by increasing the engine speed to a range of 1400-1800 RPM;
- receive the signal corresponding to the fill state of the DPF being at or above a third threshold, greater than the second threshold, and
- selectively limit the power output of the diesel engine in response to receiving the signal corresponding to a fill state of the DPF being at or above a third threshold, greater than the second threshold.

* * * * *